Patented Sept. 22, 1953

2,653,161

UNITED STATES PATENT OFFICE 2,653,161

SULFUR AND PHOSPHORUS-CONTAINING ESTERS

Seaver A. Ballard, Orinda, Rupert C. Morris, Berkeley, and John L. Van Winkle, San Lorenzo, Calif., assignors to Shell Development Company, Emeryville, Calif., a corporation of Delaware No Drawing. Application December 2, 1950, Serial No. 198,912

10 Claims. (Cl. 260—461)

This invention relates to new organic compounds containing phosphorus, and it more particularly relates to new esters of organo-phosphorus acids. Still more particularly, the present invention relates to new esters of sulfur-containing alcohols and organo-phosphorus acids.

The new compounds provided by the present invention are esters of organo-phosphorus acids with sulfur-containing alcohols, wherein the alcohol residue contains a chain of carbon atoms, which chain is interrupted at least once by divalent sulfur, or a thioether or polysulfide linkage, both valencies of the divalent, or thioether sulfur atom or atoms being satisfied by direct attachment to carbon or sulfur. The esters of the invention are readily prepared by treating with acid halides of organic oxy-acids of phosphorus, such sulfur-containing alcohols, or mixtures thereof, as are obtained; by treatment of halohydrins with alkali sulfides; by additively reacting, combining, or condensing mercaptans with epoxide-containing organic compounds, e. g., 1,2- and 1,3-alkylene oxides and haloepoxyalkanes; by combining mercaptans or hydrogen sulfide with olefinically unsaturated alcohols, e. g., allyl alcohol; and by adding hydrogen sulfide or mercaptans to halo-substituted olefins, e. g., allyl chloride, and hydrolyzing the resulting halo-substituted thioether to replace halogen by hydroxyl or condensing the halo-substituted thioether with alkali metal derivatives of glycols to produce higher molecular-weight sulfur-containing alcohols. The new organo-phosphorus acid esters of this invention are of particular interest in some cases for use as hydraulic fluids, and they also can be used advantageously alone or in combination with other materials, such as hydrocarbon oils, as lubricants. Some of the esters of the invention are also useful as insecticides or other agricultural aids. Of particular interest in these and related uses are the sulfur-containing esters of the above type of the organic oxyacids of pentavalent phosphorus, i. e., the phosphonates and the phosphinates of the invention.

The organo-phosphorus acids, novel esters of which are provided by the present invention, include phosphonic acids, phosphinic acids, phosphonous acids, and phosphinous acids. In the phosphonic acids and in the phosphinic acids the phosphorus atom is the state generally referred to as the pentavalent state; that is, it is directly linked by univalent bonds to three univalent radicals, and by a double bond, or covalent linkage, to an atom of oxygen or sulfur. The phosphonic acids are dibasic acids that correspond to the general formula

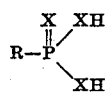

in which R is an organic radical that is bonded to the phosphorus atom by a carbon-to-phosphorus bond and each X is oxygen or sulfur. The phosphinic acids are monobasic acids corresponding to the general formula

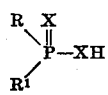

in which R and X are as above and R¹ may be hydrogen or a second radical as denoted by R. In the phosphonous acids and in the phosphinous acids the phosphorus atom is in the trivalent state. The phosphonous acids are divalent acids having structures corresponding to the formula

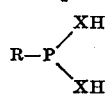

in which R and X are defined as above, while the phosphinous acids are the monobasic acids that correspond to the formula

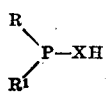

in which R, R¹ and X are defined as above. Representative phosphonic acids, novel esters of which are provided by the present invention, include, among others, benzene phosphonic acid, p - chlorobenzenephosphonic acid, propane - 1- phosphonic acid, butane-2-phosphonic acid, 2,2,4- trimethyl - 1 - pentenephosphonic acid, tetradecanephosphonic acid, cyclohexanephosphonic acid and 2-phenylethane-1-phosphonic acid, while representative phosphinic acids, novel esters of which are provided by the invention, include such disubstituted acids as dibutanephosphinic acid, benzene(methane)phosphinic acid, and benzene(butane)phosphinic acid, as well as monosubstituted phosphinic acids, such as butanephosphinic acid, benzenephosphinic acid, and 2-propenephosphinic acid. The monosubstituted phosphinic acids have been regarded as being tautomers of phosphonous acids, while the disubstituted phosphinic acids do not have a similarly corresponding tautomeric form. Illustrative phosphinous acids are dibutanephosphinous acid and dibenzenephosphinous acid. In such organo-phosphorus acids, the organic group that is directly linked to the phosphorus atom by a carbon-to-phosphorus bond may be an unsubstituted hydrocarbon group, such as aryl, alkyl, alkenyl, or cycloalkyl, or it may be a hydrocarbon group having substituted thereon one or more substituents, such as hydroxy, alkoxy, nitro, cyano, carboalkoxy, acyl, or acyloxy, for the purposes of the present invention the acids wherein said organic group is an unsubstituted hydrocarbon group being preferred.

The esters of the present invention are esters of organo-phosphorus acids, as defined above, in which the alcohol residue or residues contains or contain at least one divalent aliphatic radical, e. g., an alkylene group, that is linked, on the one hand through a single divalent atom of oxygen or sulfur to the phosphorus atom and, on the other hand, directly to a divalent sulfur atom which, in turn, is directly linked to a second organic radical by a bond directly to an atom of carbon or through one or more directly interconnected atoms of divalent sulfur to an atom of carbon. The esters of the invention may be stated to conform to the general formula

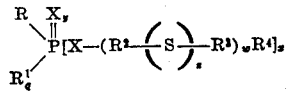

in which R, R¹, and X are defined as hereinbefore, R² and R³ are divalent aliphatic organic radicals, which may be the same or different, and which preferably may be alkylene groups, R⁴ is hydrogen, hydroxyl, mercapto, or alkoxy, $y$ represents 0 or 1, $q$ represents 0 or 1, $x$ represents $2-q$, and $w$ and $z$ represent small whole positive numbers, such as 1, 2, 3, 4, etc., which may be the same or different. In a more limited, preferred group of esters of the invention, X represents oxygen, R² represents an organic radical that is directly bonded to the phosphorus atom by a carbon-to-phosphorus bond, $y=1$, $z=1$ and R⁴ represents hydrogen, the remaining indicia being defined as above. In the definition of a still more limited and particularly preferred group of the novel compounds the formula defined above is further restricted by limitation of R² to the propylene radical (—CH₂—CH₂—CH₂—)

The esters of the present invention can be conveniently prepared by treating with acid halides of organo-phosphorus acids, i. e., with organic halophosphines and with organic oxyhalophosphines, thioesters and polysulfides that correspond to the general formula

in which the several indicia are defined as above. Such thioethers and polysulfides can be prepared by various methods. According to one suitable method, monohydroxy thioethers that are suited to preparation of novel esters of the invention can be prepared by addition, under the deliberate influence of actinic light, according to the method of Rust and Vaughan (U. S. 2,392,294), or in the presence of an organic peroxide and a metal salt of a strong inorganic acid, according to the method of Hoeffelman and Berkenbosch (U. S. 2,352,435), of mercaptans to beta,gamma-olefinically unsaturated alcohols. Such monohydroxy-substituted thioethers include, for example, 3-amylmercapto-1-propanol, 3-butylmercapto-1-propanol, 3-decylmercapto-2-methyl-1-propanol, 3-dodecylmercapto-2-propyl-1-propanol, 3-(2-butylmercapto)-1-propanol, 3-hexylmercapto-2-methyl-1-propanol, 3-propylmercapto-1-propanol, 3-(3-methyl-3-hexylmercapto)-1-methyl-2-butanol, and 3-(1,2-dimethylbutylmercapto)-1-propanol. Unsaturated hydroxy-substituted thioethers may also be employed, such as 3-allylmercapto-1-propanol, 3-methallylmercapto-1-methyl-1-propanol and 3-(4-pentenylmercapto)-1-propanol. In general, the monohydroxy-substituted thioethers of this type from which a preferred type of ester provided by the invention can be obtained, are those in which both the sulfur atom and the oxygen atom are linked only to primary carbon atoms. In the preferred esters of this type, the alcohol residue is represented by the formula —R²—S—R³—H, e. g., an alkylmercaptoalkyl group, and the ester has the formula

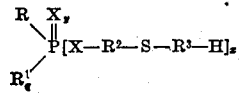

in which R, R¹, X, $q$, $y$ and $x$ are as defined hereinbefore, and R² and R³ are alkylene groups. Of this group of esters, which includes species that are of particular and outstanding value as hydraulic fluids, as lubricants for special purposes, and like fluids used in and for the transmission of power, those esters represented by the immediately preceding formula where $X=1$, $q=0$ or 1, and R and R² represent hydrocarbon groups which may be the same or different, are particularly useful compounds.

Suitable dihydroxy-substituted thioethers that can be used in the preparation of the organo-phosphorus acid esters of the invention can be prepared by treatment of beta,gamma-olefinically unsaturated alcohols with H₂S in the presence of a catalyst, such as an amine, a metallic oxide, or a peroxide. See, for example, U. S. 2,484,369. The dihydroxy-substituted thioethers may be polymerized to produce higher molecular alcohols of the general formula H—[O—R—S—R]ₙOH in which each R represents a saturated organic radical, such as an alkylene group of from two to three carbon atoms which may be substituted by one or more aliphatic groups, such as alkyl groups containing up to 4 carbon atoms, and $n$ is an integer greater than 1. Illustrative dihydroxy-substituted thioethers that can be used for the preparation of novel esters of the invention include, without being limited to, bis(1-methyl-2-hydroxyethyl)sulfide, bis(1-ethyl-2-hydroxyethyl)sulfide, bis(1-ethyl-2-hydroxypropyl)sulfide, bis(3-hydroxypropyl)sulfide, bis(2-methyl-3-hydroxypropyl)sulfide, bis(2-ethyl-3-hydroxypropyl)sulfide, 3-hydroxypropyl 2-methyl-3-hydroxypropyl sulfide and bis(dimethylhydroxymethyl)sulfide. In such dihydroxy thioethers, the radicals that are directly linked to the sulfur atom may be like or unlike, e. g., the compounds may be symmetric or asymmetric, the symmetric members of the class being preferred because of the greater ease and lower cost with which they may be prepared. Among these and the analogous and homologous dihydroxy thioethers that can be used to prepare novel esters of the invention, those in which the carbon-sulfur and the carbon-oxygen linkages involve primary carbon atoms only, as in bis(3-hydroxypropyl) sulfide, are particularly preferred because of the higher stability of the esters and their resulting better adaptability to important uses, e. g., hydraulic fluids, etc.

In the esters of such dihydroxy-substituted ethers and of polymers thereof, either one or both of the terminal hydroxy groups may be combined in ester linkage with the organo-phosphorus acid. When only one of the terminal hydroxy groups is thus combined the ester can be described by the general formula

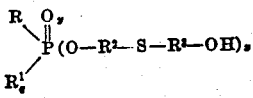

An illustrative ester having a structure represented by this formula is bis[3-(3-hydroxypropylmercapto)propyl] benzenephosphonate. When both of the hydroxy groups are combined with a dibasic organophosphonic acid, linear polyesters of the following types are provided:

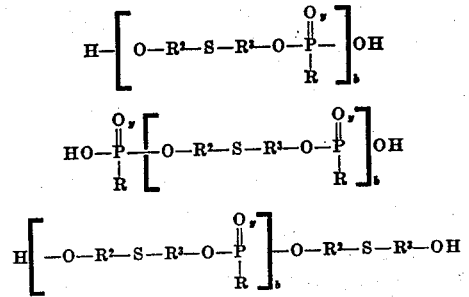

in which $y=0$ or $1$ and R, $R^2$ and $R^3$ are as hereinbefore defined, and $b$ is a whole positive number. With monobasic organophosphorus acids, e. g., the disubstituted phosphinic acids, only esters of the type

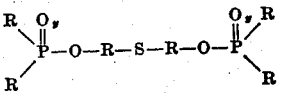

are possible when both of the terminal hydroxyls are combined in ester linkages with the organophosphorus acid. Representative of the above types of linear polyesters of divalent organophosphorus acids with dihydroxy-substituted thioethers, such as bis(hydroxyalkyl) sulfides, are the linear polyesters of benzenephosphonic acid with bis(3-hydroxypropyl) sulfide and with bis-(2-hydroxyethyl) sulfide represented by the formulas:

A. *Polyester of benzenephosphonic acid and bis-(3-hydroxypropyl) sulfide*

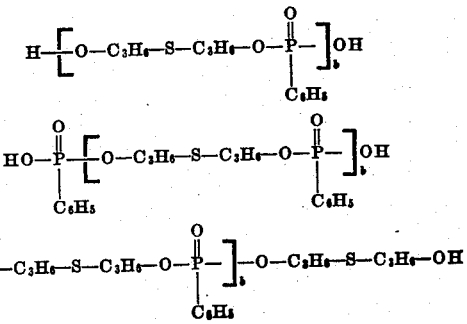

B. *Polyester of benzenephosphonic acid and bis-(2-hydroxyethyl) sulfide*

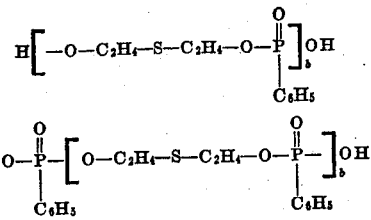

and

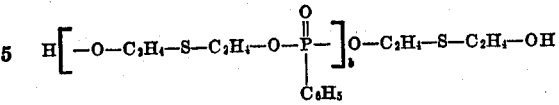

While in many cases hydroxy, mercapto, and hydroxy-and mercapto-substituted thioethers suited to the preparation of the phosphorus-containing esters of the invention can be prepared by the addition of $H_2S$ or mercaptans to olefinically unsaturated alcohols or ethers, it will be appreciated by those skilled in the art that in at least some of the cases other methods can be used. For example, glycerol alpha-decyl thioether can be prepared by treatment of 2,3-epoxy-1-chloropropane with decyl mercaptan and sodium hydroxide, while bis(gamma-chloro-beta-hydroxypropyl) sulfide can be prepared by treatment of 2,3-epoxy-1-chloropropane with $H_2S$ at about 125° C. In general, methods that can be used for the preparation of sulfur-containing alcohols from which esters of the invention can be prepared include the following:

1. Treatment of halohydrins, such as ethylene chlorohydrin, glycerol gamma-monochlorohydrin, propylene chlorohydrin, etc., with alkali sulfides, such as $Na_2S$.

2. Treatment of epoxide compounds, especially 1,2-epoxides, such as ethylene oxide, propylene oxide, epichlorohydrin, etc., with $H_2S$ or mercaptans.

3. Addition of $H_2S$ or mercaptans to halogen-substituted olefins, followed by hydrolysis to replace the halogen atom or atoms by hydroxyl.

For the preparation of sulfur-containing alcohols from which a preferred group of esters of the invention are prepared, namely, alcohols of the general formula

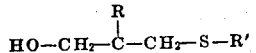

in which R is hydrogen or an alkyl group and R' is a monovalent aliphatic radical, e. g., an alkyl group, it generally is most convenient to employ the method that is based upon the addition of aliphatic mercaptans to alcohols of the type

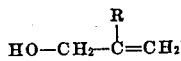

in which R is as immediately above.

For the preparation of the novel phosphorus-containing esters of the present invention, sulfur-containing alcohols of the hereinbefore defined type may be treated with oxy halophosphines to produce phosphonates and phosphinates and with halophosphines to produce phosphonites and phosphinites. The reactions may be illustrated by the equations appearing immediately below. In the equations, 3-hydroxypropyl amyl sulfide is employed as an illustrative hydroxy-substituted thioether and R signifies an organic radical that is directly bonded to the phosphorus atom by a carbon-to-phosphorus bond.

Equation A, for the preparation of phosphonates:

Equation B, for the preparation of phosphinates:

Equation C, for the preparation of phosphonites:

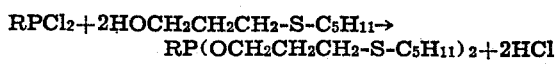

Equation D, for the preparation of phosphinites:

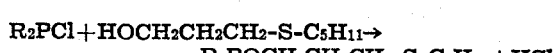

The foregoing reactions may be carried out by mixing the selected oxyhalophosphine or halophosphine, if desired in the form of a solution in an inert organic solvent, such as an aromatic hydrocarbon solvent, with the sulfur-containing alcohol corresponding to the desired ester. The reactants conveniently may be employed in substantially the stoichiometrically required amounts, although in the event one reactant is more precious than the other a moderate excess of the less precious may be employed to insure high conversion of the other reactant to desired product. In general, the reactants are employed in proportions representing equivalent ratios having values up to about 3. (The term "equivalent ratio" refers to the numerical value obtained by dividing the number of moles furnished of one reactant by the quotient obtained by dividing the number of moles furnished of the other reactant by the number of moles thereof stoichiometrically required for the reaction with the first-mentioned reactant.) The reactions described by the foregoing equations may be carried out at temperatures within the range of about 0° C. to about 100° C.; the more limited range from about ordinary room temperature up to about 65° C. being preferable. In the event excessive heat is liberated in the reaction mixture, the reaction mixture may be cooled or the reaction may be maintained under control by dilution of the mixture with an inert solvent. The reaction may also be regulated by the controlled addition of one reactant, e. g., the oxyhalophosphine or halophosphine, to the other reactant. The reaction preferably is carried out in the presence of a compound or a material which combines with or absorbs the liberated hydrogen halide, such as an amine, e. g., pyridine, triamylamine, etc., or other basic-acting substance. Upon completion of the reaction any amine salt formed by the reaction of the added amine and the liberated hydrogen halide may be removed from the reaction mixture by filtration or equivalent means and the filtrate suitably treated to recover the desired ester. In most cases fractional distillation is the most convenient method for recovering the desired product although it will be appreciated that other applicable methods may be used in appropriate cases.

The following examples will illustrate certain of the various possible specific embodiments of the invention. It will be appreciated that the examples are presented with the intent of illustrating the invention and not to limiting the same as it is defined in the hereto appended claims.

*Example I.—Bis(7-methyl-4-thia-1-octyl) benzenephosphonate*

The ester described in this example is prepared by treating 3-hydroxypropyl amyl sulfide (7-methyl-4-thia-1-octenol) with phenyloxydichlorophosphine (benzenephosphonic dichloride). For the preparation of 3-hydroxypropyl amyl sulfide a mixture of allyl alcohol and amyl mercaptan is placed in an open vessel equipped with a mechanical stirrer and while the mixture is stirred it is irradiated by exposure to light from a quartz mercury ultraviolet lamp. After 24 hours at 100° C. to 110° C. the mixture is fractionally distilled, 3-hydroxypropyl amyl sulfide being separated as a light yellow liquid boiling at 84° C. to 85° C. under 0.4 mm. mercury pressure.

To 353 grams of the 3-hydroxypropyl amyl sulfide there are added at 0° C. 195 grams of phenyloxydichlorophosphine dissolved in 1000 cc. of toluene, and 158 grams of pyridine as HCl acceptor. The resulting mixture is heated with agitation for 3 hours at 100° C. and then filtered (to remove precipitated pyridine hydrochloride) and the filtrate is fractionally distilled. Bis(7-methyl-4-thia-1-octyl) benzenephosphonate is recovered as a light-yellow, almost odorless, oil boiling at 106° C. under a pressure of <0.1 mm. mercury. The structure of bis(7-methyl-4-thia-1-octyl) benzenephosphonate is as follows:

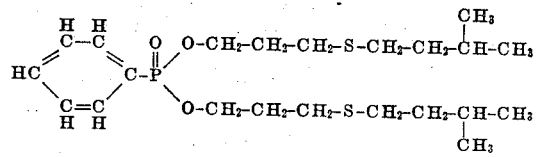

The sample of the bis(7-methyl-4-thia-1-octyl) benzenephosphonate is analyzed and found to contain 7.4% P, 58.6% C and 8.7% H, compared to the calculated values of 6.95% P, 59.1% C and 8.74% H.

The "pour point" of a sample of the bis(7-methyl-4-thia-1-octyl) benzenephosphonate is determined by the method described in "1947 Supplement to Book of A. S. T. M. Standards," part III-A, page 1. The pour point of the bis(7-methyl-4-thia-1-octyl) benzenephosphonate is found to be below −65° F.

The absolute viscosity of a sample of the bis(7-methyl-4-thia-1-octyl) benzenephosphonate is determined at 100° F. and at 210° F. The following values are obtained:

| Temperature | Viscosity in Centistokes |
| --- | --- |
| 100° F | 18.70 |
| 210° F | 3.91 |

The viscosity index of the bis(7-methyl-4-thia-1-octyl) benzenephosphonate, calculated according to the Hardiman and Nisson system, is found to be 123. The bis(7-methyl-4-thia-1-octyl) benzenephosphonate is found to be remarkably stable when exposed to oxidizing conditions in contact with various metals, the test being conducted according to a modification of the test for resistance to corrosion and oxidation described in "Federal Specification," VV-L-791d, Test 530.81. In this modified test, separate samples of the bis(7-methyl-4-thia-1-octyl) benzenephosphonate are tested for resistance to oxidation and corrosion of metals in the presence of copper, magnesium, iron, cadmium and aluminum, respectively, by aerating the samples with a vigorous stream of gaseous oxygen for 71 hours at room temperature in contact with weighed test strips of the metals. The test strips then are withdrawn and the loss in weight determined as a measure of the amount of corrosion. The following results are observed in such test of bis(7-methyl-4-thia-1-octyl) benzenephosphonate:

| Metal | Weight Less mg./cm.² |
|---|---|
| Copper | 17.0 |
| Magnesium | 2.1 |
| Iron | 0.0 |
| Cadmium | 0.0 |
| Aluminum | 0.0 |

Although under these conditions the bis(7-methyl-4-thia-1-octyl) benzenephosphonate is slightly corrosive towards copper and towards magnesium, it is inert with respect to iron, cadmium and aluminum. Such inertness of the ester in conjunction with its viscosity characteristics shows that the ester has considerable value as a hydraulic fluid.

*Example II.—Preparation and properties of bis(7-methyl-4-thia-1-octyl) 2,2,4-trimethyl-1-pentenephosphonate*

To a mixture of 438 grams of 7-methyl-4-thia-1-octanol, 204 grams of pyridine, and 1000 cc. of toluene there are slowly added at 0° C. 282 grams of 2,2,4-trimethyl-1-pentenephosphonic dichloride. When the addition is complete the mixture is heated at 90° C. to 95° C. for 2.5 hours. Pyridine hydrochloride then is filtered from the cooled mixture and the filtrate is fractionally distilled through a molecular still. Bis(7-methyl-4-thia-1-octyl) 2,2,4-trimethyl-1-pentenephosphonate is obtained as a substantially odorless clear liquid having a specific gravity (20°/4°) of 0.9934, a refractive index ($n$ 20/D) equal to 1.4907 and distilling at 137° C. to 139° C. under 0.007 millimeter mercury pressure.

Corrosivity of the bis(7-methyl-4-thia-1-octyl) 2,2,4-trimethyl-1-pentenephosphonate is found to be nil with respect to magnesium, iron and aluminum when tested by the modified test described in Example I. The product has high thermal stability, a pour point below −65° F. and a viscosity index (Dean and Davis) of 121. The absolute viscosity at 100° F. is 22.30 cs.

*Example III. — Bis(4,8-dithianonyl) benzene-(trimethylbenzene) phosphinate*

This ester is prepared by the reaction between phenyl(trimethylphenyl) oxychlorophosphine, and 3-methylmercaptopropyl 3-hydroxypropyl sulfide. The latter reactant can be prepared by addition of 3-methylmercaptopropyl mercaptan to allyl alcohol according to the method described in Example I. For the preparation of bis(4,8-dithianonyl) benzene(trimethylbenzene)phosphinate, equimolar quantities of 3-methylmercaptopropyl 3-hydroxypropyl sulfide and phenyl(trimethylphenyl) oxychlorophosphine are heated in the presence of about an equal weight of toluene to about 40° C. in the presence of added pyridine. Upon completion of the reaction, the reaction mixture is filtered to remove precipitated pyridine hydrochloride and lower boiling materials are flashed from the filtrate in vacuo, leaving a high boiling residue composed predominantly of bis(4,8-dithianonyl) benzene(trimethylbenzene)phosphinate. The structure of the product is as follows:

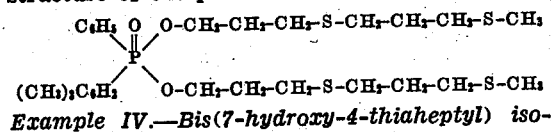

*Example IV.—Bis(7-hydroxy-4-thiaheptyl) isobutanethiaphosphonate*

This ester is made by reacting bis(gamma-hydroxypropyl) sulfide and isobutanethiadichlorophosphine. For the preparation of bis(gamma-hydroxypropyl) sulfide 500 parts of allyl alcohol and 124 parts by weight of hydrogen sulfide are mixed in a quartz tube and irradiated with a 250 watt arc lamp for 2 hours. During the reaction time the temperature is within the range of 100° C. to 150° C. due, in part, to the exothermic reaction, but mainly due to the heat from the mercury arc lamp. The mixture is then subjected to fractional distillation, that part remaining in the still at a kettle temperature of 134° C. at 0.3 cm. mercury pressure being bis(gamma - hydroxypropyl) sulfide. The bis(gamma-hydroxypropyl) sulfide is mixed with a equivalent amount of isobutylthiadichlorophosphine in the presence of toluene and added pyridine. The mixture is maintained at about room temperature until the reaction is completed as evidenced by cessation of formation of pyridine hydrochloride. The precipitated pyridine hydrochloride is removed by filtration and the toluene and other low boiling materials are distilled from the filtrate to leave as a high boiling residue the bis(7-hydroxy-4-thiaheptyl) isobutanethiaphosphonate. The structure of this ester is as follows:

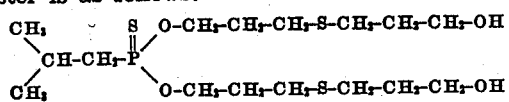

By treating the ester with an acyl halide, e. g., 2,4-dichlorobenzoyl chloride, the terminal hydroxyl groups can be esterified or by treatment with an alkylating agent, e. g., dimethylsulfate, they can be etherified, to remove any reactive tendency of the free hydroxyl groups.

*Example V.—Bis(5-hydroxy-2,4,4-trimethyl-3-thiaphentyl) dimethanephosphinate.*

This ester is prepared from 1-methyl-2-hydroxyethyl (1,1-dimethyl-2-hydroxyethyl)sulfide and dimethyloxychlorophosphine according to the procedure in the foregoing examples. The structure of the bis(5-hydroxy-2,4,4-trimethyl-3-thiapentyl) dimethanephosphinate is as follows:

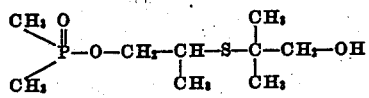

In addition there is formed the isomeric ester 5 - hydroxy - 2,2,4 - trimethyl - 3 - thiapentyl dimethanephosphinate having the following structure

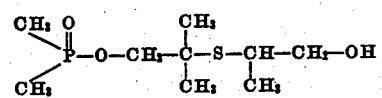

and smaller amounts of the diester having the structure

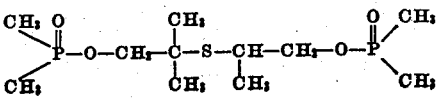

In addition to the compounds specifically illustrated in the foregoing examples, there can be prepared in an analogous manner related esters of organo-phosphorus acids and linear sulfur containing alcohols wherein a chain of carbon atoms is interrupted at least once by divalent sulfur. The following are exemplary of such additional esters of organo-phosphorus acids provided by the present invention.

PHOSPHONATES

Bis(4-thiaoctyl) p-chlorobenzenephosphonate
Bis(2-methyl-4-thiaoctyl) methanephosphonate
Bis(2 - methyl - 4 - thiaeicosyl) 3 - methylbutanephosphonate
Bis(7-butoxy-4-thiaheptyl) benzenephosphonate
Bis(3 - isopropylmercaptopropyl) benzenephosphonate
Bis[3 - (decylmercapto)propyl] benzenephosphonate

PHOSPHINATES

7 - methyl - 4 - thiaoctyl bis(methylbenzene)-phosphinate
7 - methoxy - 4 - thiaheptyl dimethanephosphinate
2 - methyl - 4 - thiaoctyl benzene(trimethylbenzene)phosphinate
7 - hydroxy - 4 - thia - 2 - methylheptyl 2-ethylhexanephosphinate

PHOSPHONITES

Bis(4 - thiaoctyl) benzenephosphonite
Bis(7 - methyl - 4 - thiaoctyl) 3 - chloro - 4 - methylbenzenephosphonite
Bis(7 - hydroxy - 4 - thiaheptyl) p - chlorobenzenephosphonite
Bis(7 - methyl - 4 - thiaoctyl)propane - 2 - phosphonite

PHOSPHINITES

7 - methyl - 4 - thiaoctyl dibenzenephosphinite
7 - hydroxy - 4 - thiaheptyl dibenzenephosphinite
4,8 - dithianonyl methane(benzene)phosphinite
7 - butoxy - 4 - thiaheptyl dibenzenephosphinite The esters of the present invention are useful as hydraulic fluids, as plasticizers, as special solvents, and as lubricants for use in special applications. As hydraulic fluids they are adapted particularly for use in airplanes, airships, and the like, wherein exposure to extremes in temperatures are the rule rather than the exception. Their high viscosity index, low pour point, and substantial non-corrosivity towards commonly used materials of construction contribute materially to the usefulness of such esters in this application.

When desired, the sulfur- and phosphorus-containing esters of this invention may have incorporated therewith modifiers of the viscosity characteristics, corrosion inhibitors, antioxidants, and the like to modify one or more of their properties. Mixtures of such additives may be employed. Although the products of the invention are characterized in many cases by an already desirably high viscosity index, the viscosity index may be increased to an even higher level by addition of a thickener, such as polymeric, acrylic or methacrylic ester, alkylated styrene polymer, or polymerized olefin, e. g., isobutylene polymer or butene polymer. The preferred thickeners or modifiers of the viscosity index are polymerized esters of methacrylic acid and aliphatic alcohols having from 2 to 15 carbon atoms and include polymers of but a single ester as well as polymers (copolymers) of mixtures of such esters. Such polymeric esters preferably have molecular weights between 5000 and 15,000 and are employed in amounts generally between about 0.5 and 5% by weight of the sulfur- and phosphorus-containing ester. The thickener may be added as such or as a solution in a solvent, such as a hydrocarbon solvent.

By further modifying the viscosity characteristics by the addition of gelling agents, greases, useful as lubricants, can be prepared from or with the products of the present invention. Satisfactory gelling agents include lithium, barium, aluminum, and like soaps of high molecular weight fatty acids (e. g., of stearic or other fatty acids containing from 14 to 32 carbon atoms) and of hydroxy acids (e. g., of tartaric, lactic, or ricinoleic acid) and mineral colloids in the gel form and having a structure resembling that of an aerogel, such as colloidal silica, magnesia, alumina, and various clays. In the preferred case, the gelling agent is employed in an amount ranging from about 1% to about 10% of the grease composition.

Antioxidants and corrosion inhibitors can be used with the sulfur- and phosphorus-containing esters of the invention when desirable. Particularly effective are epoxide compounds and sulfur-containing compounds, which preferably are employed together. Glycidyl ethers, such as glycidyl phenyl ether, glycidyl isopropyl ether, and glycidyl benzyl ether, as well as other epoxide compounds, such as styrene oxide and epichlorohydrin, are among the suitable epoxide compounds. Typical of the suitable sulfur-containing compounds are, in particular, hydrocarbon sulfides and hydrocarbon disulfides, such as the benzyl sulfide, butyl disulfide and wax disulfide. In general the corrosion or oxidation inhibitor is used in an amount from about 0.05% to about 5% by weight of the total composition.

We claim as our invention:

1. Bis(7-methyl - 4 - thiaoctyl) benzenephosphonate.

2. A bis(3-alkylmercaptoalkyl) arylphosphonate.

3. A phosphonate having the formula

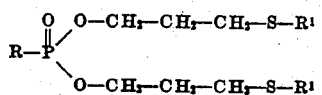

in which R is a member of the class consisting of hydrocarbon and halogen-substituted hydrocarbon radicals, the radical represented by R being directly linked to the phosphorus atom by a carbon-to-phosphorus bond and each $R^1$ is an alkyl group.

4. A phosphonate defined by claim 3 when the radical represented by R is composed exclusively of atoms of carbon and of hydrogen.

5. Bis(7 - methyl-4-thiaoctyl) 2,2,4-trimethyl-1-pentene phosphonate.

6. A bis(3-alkylmercaptopropyl) 1-alkenephosphonate.

7. An ester of benzenephosphonic acid and a bis(hydroxyalkyl) sulfide.

8. An ester of a bis (hydroxyalkyl) sulfide and an arylphosphonic acid.

9. An ester of phosphonic acid and a bis (3-hydroxy alkyl) sulfide.

10. An ester of an ogano-phosphorus acid, said ester having a structure corresponding to the formula

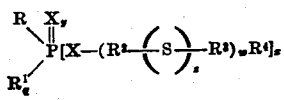

in which R is a member of the class consisting of hydrocarbon and halogen-substituted hydrocarbon radicals, the radical represented by R being directly linked to the phosphorus atom by a carbon-to-phosphorus bond, $R^1$ is a member of the class consisting of the hydrogen atom and the radicals represented by R, X is an atom of a non-metallic element of group VI-A having an atomic weight below 40, $R^2$ and $R^3$ represent divalent aliphatic hydrocarbon radicals, $R^4$ represents a member of the group consisting of hydrogen, hydroxyl, mercapto, and alkoxy, $y$ represents 0 or 1, $q$ represents 0 or 1, $x=2-q$ and $w$ and $z$ represent small whole positive numbers.

SEAVER A. BALLARD.
RUPERT C. MORRIS.
JOHN L. VAN WINKLE.

No references cited.